3,468,951
BIS-(ALKOXYARYL)ALKYL-N-ALKENYL-
AND-ALKYNYL-AMINES
Arthur K. Cho, Los Angeles, Calif., assignor, by mesne assignments, to American Hospital Supply Corporation, a corporation of Illinois
No Drawing. Filed June 14, 1965, Ser. No. 463,868
Int. Cl. C07c 93/00
U.S. Cl. 260—570      7 Claims This invention relates to a new series of compounds generally known as bis-arylalkylamines. More particularly, the invention pertains to bis-arylalkylamines of the general formula illustrated below and to the pharmaceutically acceptable acid addition salts thereof.

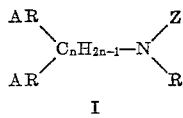

I where AR on the terminal or ω-carbon is selected from the class consisting of a lower alkoxy substituted aromatic hydrocarbon containing one to three such lower alkoxy groups each with from one to two carbon atoms, and an alkylenedioxy substituted aromatic hydrocarbon; $n$ is a positive integer from one to three; Z is a lower alkyl with from one to three carbon atoms; and R is an electron withdrawing group such as an unsaturated hydrocarbon with the unsaturation preferably no further than three carbons from the nitrogen. Examples of R are an unsaturated alkyl such as $CH_2CH=CH_2$, $CH_2C\equiv CH$; a carboalkoxy such as $CO_2C_2H_5$; and a cyanoalkyl such as $CH_2CN$.

These compounds are useful for inducing central nervous system depression and anesthesia by intravenous administration in mammals, as in the field of veterinary and human medicine.

The bis-arylalkylamine compounds of this invention also include quaternary ammonium salts with lower alkyl halides represented by the following formula:

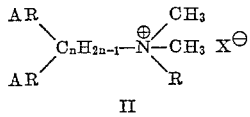

II where AR, $n$, and R are as represented in Formula I above, and X is a halide or other pharmaceutically acceptable anion.

These compounds are useful in surgical procedures as a skeletal muscle relaxant for mammals.

An illustrative group of compounds answering to the description of Formula I includes:

2,2-bis-(3',4'-dimethoxyphenyl)-N-methyl-N-propargyl-ethylamine;
2,2-bis-(3',4',5'-trimethoxyphenyl)-N-methyl-N-propargyl-ethylamine;
2,2-bis-(4'-methoxyphenyl)-N-methyl-N-propargyl-ethylamine;
3,3-bis-(3',4'-dimethoxyphenyl)-N-methyl-N-propargyl-propylamine;
3,3-bis-(3',4',5'-trimethoxyphenyl)-N-methyl-N-propargyl-propylamine;
3,3-bis-(4'-methoxyphenyl)-N-methyl-N-propargyl-propylamine;
bis-(3',4'-dimethoxyphenyl)-N-methyl-N-propyl-methyl-amine;
bis-(3',4',5'-trimethoxyphenyl)-N-methyl-N-propyl-methylamine; and
bis-(4'-methoxyphenyl)-N-methyl-N-propargyl-methyl-amine.

EXAMPLE I 2,2-bis-(3',4'-dimethoxyphenyl)-N-methyl-N-propargyl-ethylamine (2)

(a) 2,2 - bis - (3',4' - dimethoxyphenyl) - N-methyl-ethylamine (1).—A solution of 110 grams of veratrole, 1,2-dimethoxy benzene, in 150 ml. of glacial acetic acid is cooled to —5° C. and 48 gm. of the dimethylacetal of methylaminoacetaldehyde is added dropwise with continued cooling. Next, 80 ml. of concentrated sulfuric acid is added dropwise, with cooling such that the temperature is maintained below 0° C. during the addition. The mixture is stirred at this temperature for an additional two hours and then poured into a one-liter flask and allowed to stand in the refrigerator at 5° C. for six days. The solution is then poured into 100 ml. of crushed ice and solid sodium hydroxide is added to raise the pH to 10. The resulting suspension is extracted three times with 300 ml. of chloroform and the combined chloroform extracts are filtered and evaporated. To the residue, weighing 123 gm., is added a solution of 62 gm. of oxalic acid in acetone and the resulting mixture is allowed to cool in the refrigerator. The 2,2-bis-(3',4'-dimethoxyphenyl)-N-methyl-ethylamine (1) in its oxalate salt form weighing 137 gm. and melting at 193.5° to 195° C. is then collected.

(b) The oxalate salt obtained above (29 gm.) is converted to its free base by treatment with a solution of 26.5 gm. of potassium hydroxide in 100 ml. of water. The resulting suspension is extracted four times with 50 ml. of chloroform and the chloroform extracts dried over potassium carbonate and evaporated to yield 21.3 gm. of oily free base. To a solution of 15 gm. of the free base in 50 ml. of an ether-methanol 1:1 mixture is added dropwise a solution of 1.65 ml. propargyl bromide in 50 ml. of the same ether-methanol solvent. The reaction mixture is then stirred at room temperature overnight. A precipitate is formed, removed by filtration, and the solvent from the filtrate evaporated at reduced pressure. The oily residue is taken up in ether and cooled, giving crystals of 2,2-bis-(3',4'-dimethoxyphenyl)-N-methyl-N-propargyl-ethylamine (2), which melt at 79.5° to 80.5° after recrystallization from ether.

EXAMPLE II 2,2-bis(3',4'-dimethoxyphenyl)-N-methyl-N-cyanoethyl-ethylamine (3)

To a solution of 6.9 gm. of 2,2-bis-(3',4'-dimethoxyphenyl)-N-methyl-ethylamine in 50 ml. of ethanol is added 1.06 gm. of acrylonitrile. The mixture is refluxed for two hours and after standing at room temperature overnight the ethanol is removed by evaporation at reduced pressure. The residue, 7.5 gm. of oil, is treated with a solution of 3.8 gm. of oxalic acid in 50 ml. of acetone. This forms the oxalate salt which is recrystallized from acetone giving the oxalate salt of the product melting at 140.5° to 142° C. and weighing 17.5 gm.

EXAMPLE III 3,3-bis-(3',4'-dimethoxyphenyl)-N-methyl-N-propargyl-propylamine (4)

(a) 3,3-bis-(3',4'-dimethoxyphenyl) propionic acid (5).—A slurry of 63.9 gm. of 3,4-dimethoxycinnamic acid in 160 gm. of veratrole is stirred and heated in a water bath at about 80° C. and 64 ml. of concentrated sulfuric acid is added over a period of two hours. After an additional five hours of heating and stirring, the mixture is poured into 800 gm. of crushed ice in 800 ml. of water. Next, 380 ml. of cold 25% aqueous sodium hydroxide solution is added and the mixture allowed to stand at room temperature overnight. The resulting basic solution is extracted with ether, adjusted to pH 2 with 6 N hydrochloric acid, and cooled, giving 82.3 gm. of 3,3-bis(3',4'-dimethoxyphenyl) propionic acid (5) melting at 150°–152° C.

(b) 3,3-bis-(3',4'-dimethoxyphenyl)-propionic acid-N-methyl-N-benzyl amide (6).—A solution of 50 gm. of (5) in 100 ml. chloroform is added to 400 ml. benzene, cooled, then treated with 10 ml. of thionyl chloride and stirred overnight. Next, an additional 5 ml. of thionyl chloride is added, the mixture refluxed for four hours, and the thionyl chloride removed by codistillation with benzene at reduced pressure. Additional benzene is added and codistillation repeated three times, and finally the residue, stirred in 400 ml. of benzene, is treated with a solution of 34 gm. of methylbenzylamine in 80 ml. of benzene. The mixture is refluxed for two hours and allowed to stand at room temperature overnight. The precipitate formed is removed by filtration and the filtrate washed successively with hydrochloric acid, water, 10% sodium carbonate solution and water. After this washing step the organic solution is dried over magnesium sulfate, the benzene removed by evaporation at reduced pressure and the solid residue crystallized from ether to yield 26.3 gm. of the amide (6), melting at 112° to 115° C.

(c) 3,3-bis-(3',4'-dimethoxyphenyl)-N-methyl-N-benzyl-propylamine (7).—A solution of 35.0 gm. of the amide (6) in 200 ml. of tetrahydrofuran is added dropwise to a solution of 6.0 gm. of lithium aluminum hydride in 400 ml. of tetrahydrofuran while stirring the tetrahydrofuran solution. The mixture is then refluxed for ten hours, and stirred at room temperature overnight. Excess hydride present in the solution is decomposed first by the cautious addition of aqueous tetrahydrofuran, followed by addition of 6 N sodium hydroxide. The precipitated metal hydroxides are removed by filtration and the filtrate is concentrated by evaporation, yielding 32 gm. of oil. This oil is treated with an acetone solution containing 7.3 gm. of oxalic acid to form 23 gm. of the oxalate salt of (7). After recrystallization from acetone-methyl alcohol the oxalate salt of (7) melted at 152.5° to 155° C.

(d) 3,3-bis-(3',4'-dimethoxyphenyl) - N - methylpropyl amine (8).—A solution of 13 gm. of (7) is obtained from its oxalate salt by the same procedure described for obtaining (1) from its oxalate salt in Example I. This solution is then hydrogenated overnight under 40 p.s.i. of hydrogen in 30 ml. of glacial acetic acid with 0.2 gm. of platinum oxide catalyst. After removal of the catalyst by filtration the acetic acid solution is diluted with 300 ml. of water, adjusted to pH 10 with sodium hydroxide and extracted with ether. After drying and evaporation of the ether extract, 4 gm. of (8) is obtained. The oxalate salt is prepared and has a melting point of 177° to 180° C.

(e) 3,3-bis-(3',4' - dimethoxyphenyl)-N-methyl-N-propargyl-propylamine (4).—A solution of 0.99 gm. of propargyl bromide in 5 ml. of ethanol is added dropwise to a stirred solution of 5 gm. of (8) in 20 ml. of ethanol. The mixture was stirred at room temperature overnight, and refluxed for four hours on a steam bath. The alcohol is then removed by evaporation at reduced pressure and the residue redissolved in 40 ml. of a mixture of ether and water. The mixture is shaken, allowed to settle and the layers separated. The aqueous layer is then extracted twice with ether and the combined ether solutions were dried over sodium carbonate. Evaporation of solvent from the ether solutions gives a residue of (4), 1 gm. of which is converted to its oxalate salt melting at 121.5° to 124.5° C.

EXAMPLE IV 2,2-bis-(3',4'-methylenedioxyphenyl)-N-methyl-N-propargyl-ethylamine (9)

2,2-bis-(3',4'-methylenedioxyphenyl)-N-methyl - ethylamine (10) is made in the same maner as in Example I with methylenedioxybenzene substituted for veratrole (1,2-dimethoxybenzene). The product is isolated as the fumarate salt having a melting point at 176° to 179° C. after recrystallization from methanol. The amine (10) is treated with one half an equivalent weight of propargyl bromide in ether as described in Example I for the preparation of 2,2-bis-(3',4'-dimethoxyphenyl)-N-methyl-N-propargyl-ethylamine. The hydrochloride salt of (9), obtained by treatment of (9) with etheral hydrogen chloride, has a melting point of 174° to 177° C.

EXAMPLE V 2,2-bis(3',4'-diethoxyphenyl)-N-methyl-N-propargyl ethylamine (11)

This compound is made using the procedure described in Example I except that the starting material is 1,2-diethoxybenzene.

EXAMPLE VI

Bis-(3',4',5'-trimethoxyphenyl)-N-methyl-N-propargyl ethylamine (12)

The process for making this compound is similar to that of Example I except that 1,2,3 trimethoxybenzene is substituted for veratrole.

EXAMPLE VII 2,2-bis-(3',4'-dimethoxyphenyl)-N,N-dimethyl-N-propargyl ethyl ammonium iodide (13)

This quaternary ammonium salt is prepared by treatment of one equivalent weight of 2,2-bis-(3',4'-dimethoxyphenyl)-N-methyl-N-propargyl ethylamine as obtained in Example I with one equivalent weight of methyl iodide or other lower alkyl halide by methods common to the art.

EXAMPLE VIII 2,2-bis-(3',4'-dimethoxyphenyl)-N-methyl-N-allyl ethylamine (14)

This compound is made by treating one equivalent of (1) with one half of an equivalent of allyl bromide in ether by the procedure described in Example I for preparation of compound (2).

EXAMPLE IX 2,2-bis-(3',4'-dimethoxyphenyl)-N-methyl-N-carboethoxy ethylamine (15)

An equivalent amount of ethyl chloroformate is added to a suspension of (1) in cold water and the mixture stirred for thirty minutes. One equivalent of sodium hydroxide is then added and the mixture extracted with ether. Evaporation of the dried ether extract gave the product (15) as an oil.

EXAMPLE X 2,2-bis-(3',4'-dimethoxyphenyl)-N-methyl-N-ethylethanoyl ethylamine (16)

This compound is prepared from (1) by treatment with one half an equivalent weight of ethyl bromoacetate in ether as described in Example I for the preparation of compound (2).

PHYSIOLOGICAL EFFECTS OF THESE BIS-ARYLALKYLAMINE COMPOUNDS

The bis-arylalkylamine compounds of this invention have a marked physiological effect on mammals. These will be illustrated by the examples below.

2,2 - bis - (3',4' - dimethoxyphenyl)-N-methyl-N-propargyl ethylamine when administered intravenously to mammals at doses of 50 mg. per kg., induces a state of anesthesia which lasts for variable periods of time depending on the mammal. This compound is therefore useful as an intravenous anesthetic or other central nervous system depressant such as a sedative. When administered intraperitoneally at doses of 100 mg. per kg. this compound increases the mean sleeping time of phenobarbital-treated mice by 58%, indicating an ability to potentiate the effects of a sedative.

Similarly, 2,2-bis-(3,4'-dimethoxyphenyl) - N - methyl-N-cyanoethyl-ethylamine administered intraperitoneally at doses of 50 mg. per kg. increases the mean sleeping time of phenobarbital-treated mice by 38%.

2,2-bis-(3',4'-methylenedioxyphenyl) - N - methyl - N-propargyl ethylamine causes loss of righting reflexes in mice at intravenous dosages of 80 mg. per kg. Loss of righting reflexes is a test used to show a state of anesthesia in animals. It is described in "Pharmacologic Techniques in Drug Evaluation" by J. H. Nodine and P. E. Siegler, Year Book Medical Publishers, Inc., Chicago, 1964, at page 293. This compound also increases the duration of sleep induced by 30 mg. per kg. of pentabarbital threefold at an intraperitoneal dose of 23.2 mg. per kg. in mice.

2,2-bis-(3',4'-methylenedioxyphenyl) - N - methyl - N-propargyl ethylamine also performs as a metabolic inhibitor when injected intraperitoneally in doses of 23 mg. per kg. in mice. It inhibits the conversion of tremorine to oxotremorine in a mammal presumably within the liver. By virtue of being a metabolic inhibitor, this compound might be useful in lowering blood cholesterol.

The quaternary salt (13), 2,2-bis-(3',4'-dimethoxyphenyl)-N,N-dimethyl - N - propargyl - ethylammonium iodide, differs from the compounds above in that it contains a permanent charge, and as a result has different biological properties. This quaternary amine, like di-tubocurarine, can antagonize the effects of acetyl choline on the frog *rectus abdominus* muscle. This action is commonly interpreted as indicative of neuromuscular blocking action, and agents capable of this action are useful in surgical procedures where muscle relaxation is necessary. The compound (13) is without central depressant action.

I claim:
1. A compound selected from the class consisting of compounds of the formula:

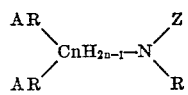

and pharmaceutically acceptable acid addition salts thereof; wherein $n$ is a positive integer from 1 to 3; Z is a lower alkyl having from one to three carbon atoms; R is an unsaturated lower alkyl; and AR is an alkoxy substituted aromatic hydrocarbon in which this substitution is from one to three such lower alkoxy groups each with from one to two carbon atoms.

2. A compound selected from the class consisting of a compound of the formula:

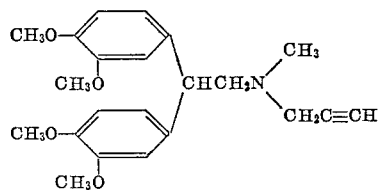

and the pharmaceutically acceptable acid addition salts thereof.

3. 2,2 - bis - (3',4' - dimethoxyphenyl)-N-methyl-N-propargyl-ethylamine.
4. 2,2 - bis - (3',4',5' - trimethoxyphenyl)-N-methyl-N-propargyl-ethylamine.
5. 2,2 - bis - (4' - methoxyphenyl)-N-methyl-N-propargyl-ethylamine.
6. 3,3 - bis - (3',4' - dimethoxyphenyl)-N-methyl-N-propargyl-propylamine.
7. 2,2 - bis - (3',4' - dimethoxyphenyl)-N-methyl-N-allyl-ethylamine.

References Cited

UNITED STATES PATENTS 3,238,092  3/1966  Boyce et al. _____ 260—570 XR
3,372,196  3/1968  Engelhardt _____ 260—570 X

OTHER REFERENCES

Quelet et al., "Chemical Abstracts," vol. 51, pp. 417–18 (1957).

ROBERT V. HINES, Primary Examiner

U.S. Cl. X.R.

260—340.5, 465, 471, 501.18, 520, 544, 561, 562, 567.6; 424—282, 300, 304, 324, 329, 330